(12) United States Patent
Xu et al.

(10) Patent No.: US 8,650,322 B2
(45) Date of Patent: Feb. 11, 2014

(54) MANIFEST MECHANISM IN BROADCAST INVOLVED SYSTEM

(75) Inventors: Yiling Xu, Suwon-si (KR); Ji Eun Keum, Suwon-si (KR); Sung Ryeul Rhyu, Yongin-si (KR); Jae Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 13/226,705

(22) Filed: Sep. 7, 2011

(65) Prior Publication Data
US 2012/0117263 A1 May 10, 2012

Related U.S. Application Data

(60) Provisional application No. 61/380,681, filed on Sep. 7, 2010.

(51) Int. Cl.
*G06F 15/16* (2006.01)

(52) U.S. Cl.
USPC .......... 709/231; 709/219; 709/230; 386/241; 386/248; 386/318

(58) Field of Classification Search
USPC ................. 709/230, 231; 386/241, 248, 318
See application file for complete search history.

(56) References Cited

U.S. PATENT DOCUMENTS

| | | | |
|---|---|---|---|
| 7,269,775 B2 | 9/2007 | Pendakur et al. | |
| 8,205,004 B1 * | 6/2012 | Kaufman et al. | 709/231 |
| 2002/0184622 A1 * | 12/2002 | Emura et al. | 725/34 |
| 2005/0036763 A1 * | 2/2005 | Kato et al. | 386/69 |
| 2006/0156354 A1 | 7/2006 | Jung et al. | |
| 2009/0049185 A1 | 2/2009 | Hudson et al. | |

* cited by examiner

*Primary Examiner* — Yves Dalencourt
(74) *Attorney, Agent, or Firm* — Jefferson IP Law, LLP

(57) ABSTRACT

A method and an apparatus for receiving manifest information by a client from a broadcast involved system are provided. The method includes accessing the broadcast involved system, receiving timing information comprising a specific entry point to check the manifest information, and acquiring the manifest information from a broadcasting channel using the timing information.

18 Claims, 11 Drawing Sheets

Same Version of Manifest is continuously presented until it is updated

MANIFEST MECHANISM IN BROADCAST INVOLVED SYSTEM

PRIORITY

This application claims the benefit under 35 U.S.C. §119(e) of a U.S. Provisional application filed on Sep. 7, 2010 in the U.S. Patent and Trademark Office and assigned Ser. No. 61/380,681, the entire disclosure of which is hereby incorporated by reference.

BACKGROUND OF THE INVENTION

1. Field of the Invention

The present invention relates to a manifest mechanism in a broadcast involved system. More particularly, the present invention relates to a method for receiving manifest information by a client from a broadcast involved system.

2. Description of the Related Art

A manifest is proposed in an adaptive stream solution. It provides information about an adaptive stream, e.g., which bitrate is used for each segment. Accordingly, a terminal could choose the proper segment based on its condition.

FIG. 1A illustrates a manifest of parameters according to the related art:

Referring to FIG. 1A, the parameters of a manifest include the following attributes:

I. Universal Resource Locator (URL) Template: A unique URL created by combining a fixed part, a segment Identifier (ID), and a track ID. It consists of URLs of each segment along with a track ID and a segment ID. The URL Template is used for accessing each segment of an adaptive stream. It can be overridden by a URL in each segment if necessary. For example:

//example.com/vod/movie/18888/Track/{TrackID}/Segments/{segmentID}.

II. NextAdaptiveControlURL: Used to indicate the next eXtensible Markup Language (XML) URL, which is used for continuous presentation. It is optional and can be used in a case of live adaptive streaming or for an advertisement user.

III. RefDataURL: Used to indicate a part of or a complete head data (.ref). It is optional when segments can decode themselves.

IV. Track: A set of contiguous segments of a particular type with different bitrates.
  i. ID: Indicates a Track ID.
  ii. Types: Indicates a type of Track and can be a Video, an Audio, Packed data (combined Video and Audio), and an I-Frame.
  iii. BitRate: Indicates a Bit rate of segments in a Track.
  iv. StartTime: An optional feature to indicate a Time stamp which specifies the start-time of a track.
  v. SegmentStartID: An optional feature to indicate an initial ID of segments which belong to the track.
  vi. SegmentDuration: An optional feature to indicate a duration of each segment.
  vii. SegmentCount: An optional feature to indicate a total number of segments which belong to the track.
  viii. Segment: A Segment is a concatenation of some basic units, each consisting of a fragment made of only audio or video data, or both audio and video data, divided based on a specific time interval. It is a basic unit transfer between a server and a client. It is also assigned a time stamp for locating or A/V sync. More specifically, an element segment is optional. If the optional attributes of a track element are specified, all of the information of each segment can be deduced so that the element segment is unnecessary.
    ID: Indicates a Segment ID.
    StartTime: A Starting time of the segment.
    Duration: A Duration of the segment.
    URL: Optional when a URL Template is used. It can be specified for special usage (e.g., Contents or an Ad Video from other server) and the URL Template would be ignored for this segment.

However, a problem may occur when the current manifest is used for an interactive network. That is, the manifest could be updated and there is no mechanism to support the manifest in the broadcast involved network. In the point to point network, the client could query the server for the next updated manifest. If it is ready, the server will send it to the client, otherwise, the server will send a response without an updated manifest.

Therefore, there is a need for a method and an apparatus for receiving manifest information by a client from a broadcast involved system.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for receiving manifest information by a client from a broadcast involved system.

Another aspect of the present invention is to provide a mechanism for a manifest delivery and an update thereof when a broadcast system is involved. The broadcast involved system means that it could be a pure broadcast system, or that a broadcast network is part of the system, e.g., a hybrid system.

In accordance with an aspect of the present invention, a method for receiving manifest information by a client from a broadcast involved system is provided. The method includes accessing the broadcast involved system, receiving timing information comprising a specific entry point to check the manifest information, and acquiring the manifest information from a broadcasting channel using the timing information.

In accordance with another aspect of the present invention, an apparatus for receiving manifest information from a broadcast involved system is provided. The apparatus includes a communication unit for receiving timing information comprising a specific entry point to check the manifest information when accessing the broadcast involved system, and a manifest parser for acquiring the manifest information from a broadcasting channel using the timing information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1A:
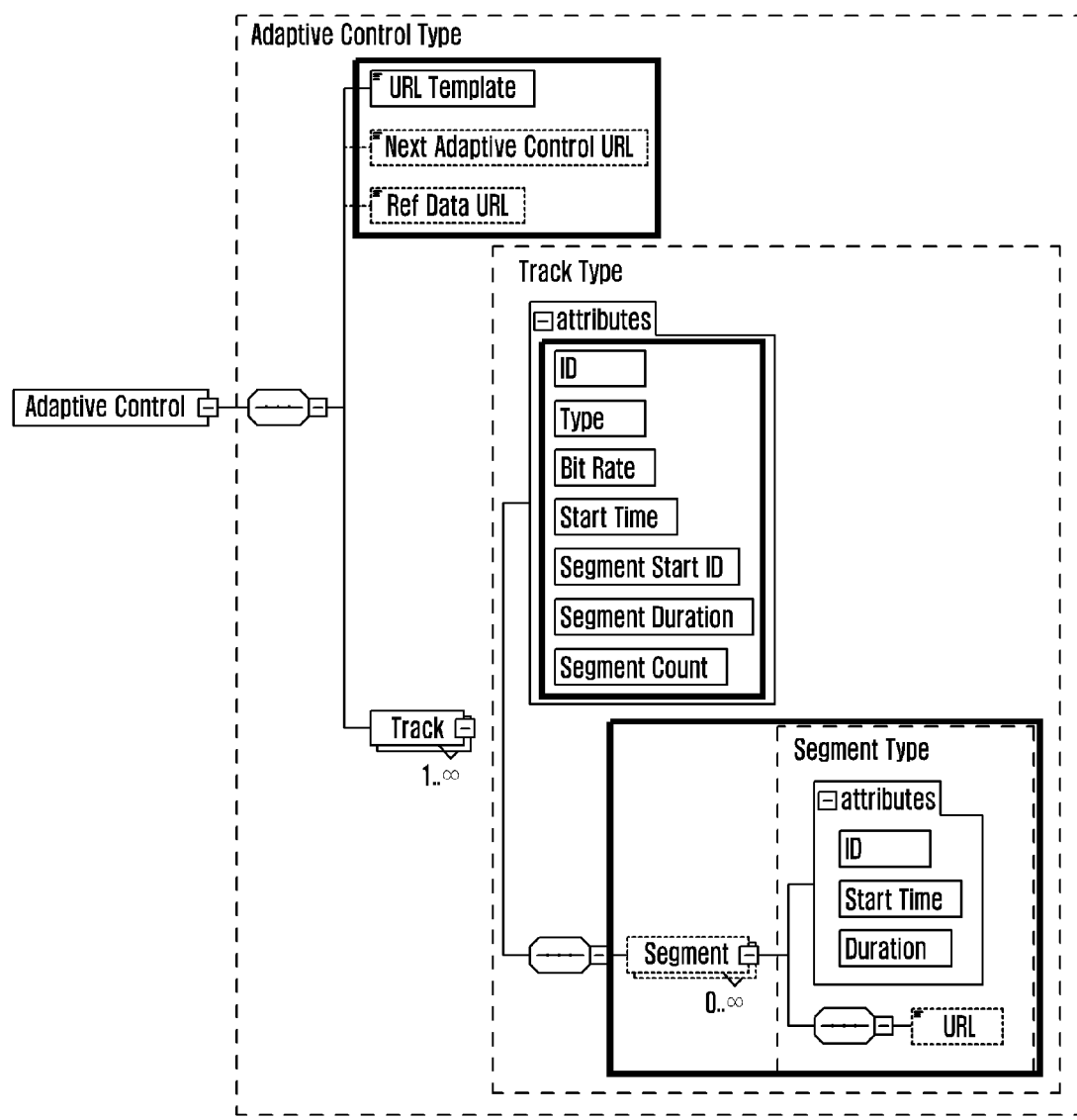
FIG. 1A illustrates a manifest of parameters according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

A current manifest in an interactive network could be updated. However, there is no mechanism to support the manifest in a broadcast involved network. In the point to point network, the client could query the server for the next updated manifest. If it is ready, the server will send it to the client, otherwise, the server will send a response without an updated manifest.

Accordingly, exemplary embodiments of the present invention disclose a method and an apparatus for receiving manifest information by a client from a broadcast involved system. The following mechanism is about a manifest delivery and an update thereof when a broadcast system is involved. The broadcast involved system denotes a pure broadcast system, or that a broadcast network is part of the system, e.g., a hybrid system.

FIGS. 1B through 10, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

1. Mechanism 1

Figure 1B:
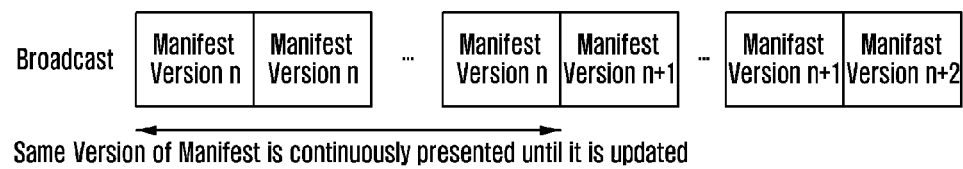
FIG. 1B illustrates a manifest delivery in a broadcast system according to an exemplary embodiment of the present invention.

FIG. 1B illustrates a manifest delivery in a broadcast system according to an exemplary embodiment of the present invention.

Referring to FIG. 1B, in a broadcast involved system, the manifest could be delivered over a broadcast system. Every manifest adds a field to indicate version information, e.g., version n, version n+1, and the like. The same version of the manifest is continuously presented to the client till it is updated. This way, the client could receive the manifest anytime when it accesses the broadcast network.

The network could be a pure broadcast network. More specifically, both manifest and real media streams are all delivered over a broadcast network. However, some of the broadcast transport stream will be assigned to deliver manifest information, and this stream is indicated by a specific entry point.

Figure 2:
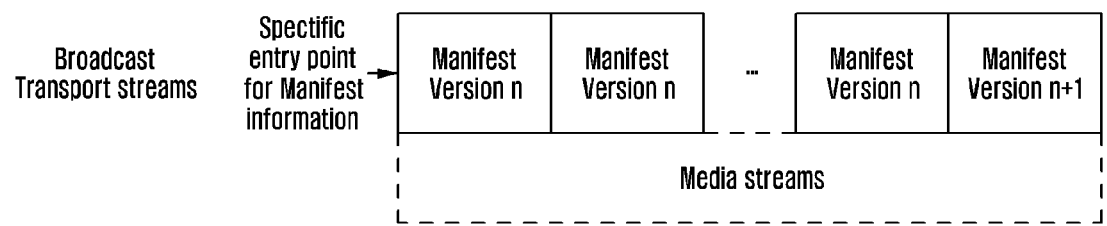
FIG. 2 illustrates a manifest entry point according to an exemplary embodiment of the present invention.

FIG. 2 illustrates a manifest entry point according to an exemplary embodiment of the present invention.

Referring to FIG. 2, whenever a client accesses a broadcast network, the client could find the manifest information through this specific entry point and know which media service is available, and how to access it.

This specific entry point could be a fixed address, or it could be signaled in the fixed field, e.g., in an INTerrupt (INT) table.

Figure 3:
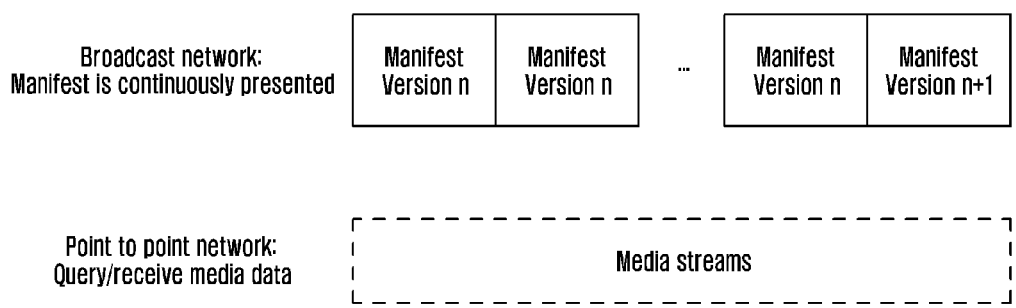
FIG. 3 illustrates a manifest in a hybrid network according to an exemplary embodiment of the present invention.

FIG. 3 illustrates a manifest in a hybrid network according to an exemplary embodiment of the present invention.

Referring to FIG. 3, the network could be a hybrid network and a broadcast network is only part of this whole system, e.g., a broadcast and a point-to-point combined network. In this case, the manifest could be delivered over the broadcast network because the client could obtain the manifest information whenever it accesses the network. The media data could be queried and received over the point-to-point network after the client accesses the manifest and chooses any media.

2. Mechanism 2

When the manifest is broadcasted as in mechanism 1, a problem may occur.

More particularly, when the client receives manifest #1, the repeated manifest #1 will not provide new information and the client only has interest about the next updated manifest #2. If the client is unaware of the off-time between the current manifest #1 and the next updated manifest #2, the client has to monitor the broadcast signal until the next updated manifest comes. Monitoring the broadcast signal requires expenditure of power and is a burden to the client. So the relative off-time or absolute updated time for the next updated manifest is proposed in the broadcast case. In the following description, an off-time is used, for example, and it could be replaced by the updated time in the application.

Figure 4:
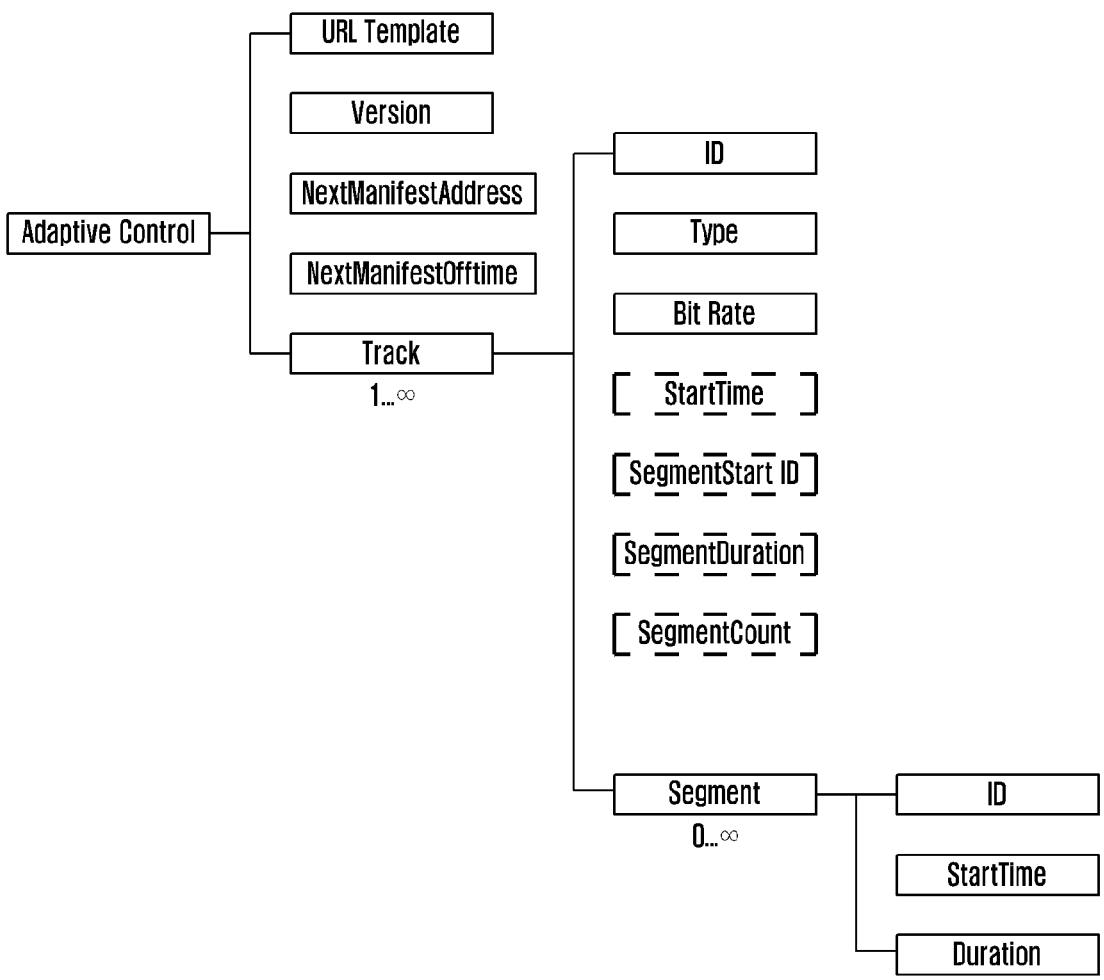
FIG. 4 illustrates a Universal Resource Locator (URL) Template (mechanism 2.1), wherein NextManifestOfftime is signaled in a current manifest according to an exemplary embodiment of the present invention.

FIG. 4 illustrates a Universal Resource Locator (URL) Template (mechanism 2.1), wherein NextManifestOfftime is signaled in a current manifest according to an exemplary embodiment of the present invention.

2.1 NextManifestOfftime is Signaled in the Current Manifest

Referring to FIG. 4, new attributes including Version, NextManifestAddress, and NextManifestOfftime are added.

Version indicates version information of the current manifest.

NextManifestAddress indicates an address of the next manifest to access it. If the manifest is signaled in the fixed or same address, this attribute could be optional.

NextManifestOfftime indicates the off-time between this manifest and the next updated manifest. Based on this information, the client does not need to monitor the manifest updated in the broadcast network until the off-time is over.

This mechanism could also be used in a point-to-point network.

2.2 Notify the Next Manifest Update

The update-time of the next manifest could be notified to the client. The notification could be defined as follows.

TABLE 1 a manifest update information notification message

| Field | Semantics |
| --- | --- |
| ManifestUpdateInfo | Identifies that this notification is about manifest update information. |
| NextManifestVersion | Identifies the version of the next manifest. |
| NextManifestOfftime | Identifies the off-time of the next manifest. If the next manifest is available now, the off-time is 0, it means the client could access it now. |

This manifest update notification could be sent to the client automatically whenever the manifest update off-time is known. Alternatively, the client could book this notification service in advance, so it could receive the update information when notification information is ready.

Figure 5:
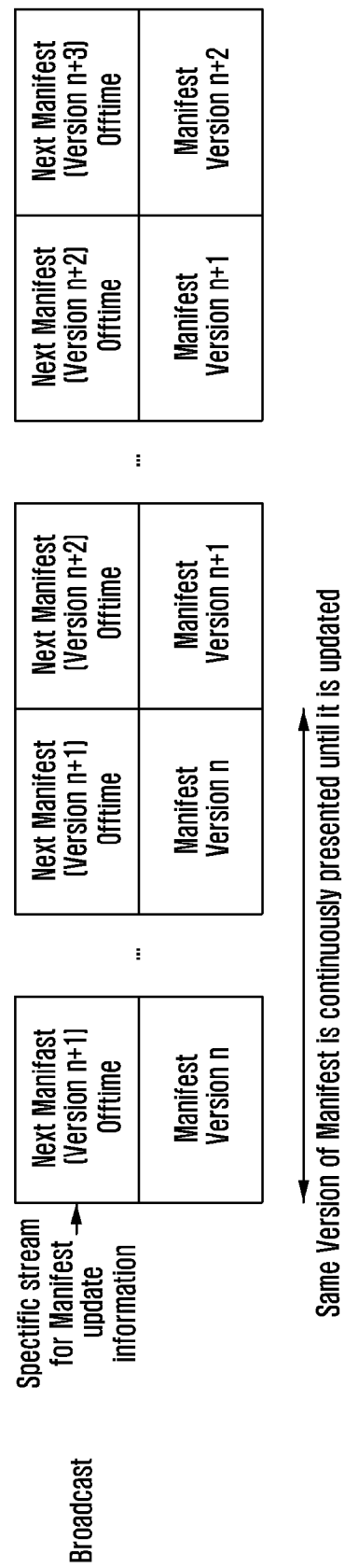
FIG. 5 illustrates a RefDataURL (mechanism 2.3), which indicates the next manifest off-time in a fixed stream according to an exemplary embodiment of the present invention.

FIG. 5 illustrates a RefDataURL (mechanism 2.3), which indicates the next manifest off-time in a fixed stream according to an exemplary embodiment of the present invention.

2.3 Signal the Next Manifest Off-Time in the Fixed Stream

Referring to FIG. 5, a specific stream inside a broadcast transport stream could be assigned to signal the manifest update information, wherein the specific stream may carry the off-time. This specific stream could be assigned a fixed Internet Protocol (IP) address, or it could be indicated by some entry point, e.g., in an INTerrupt (INT) table.

Figure 6:
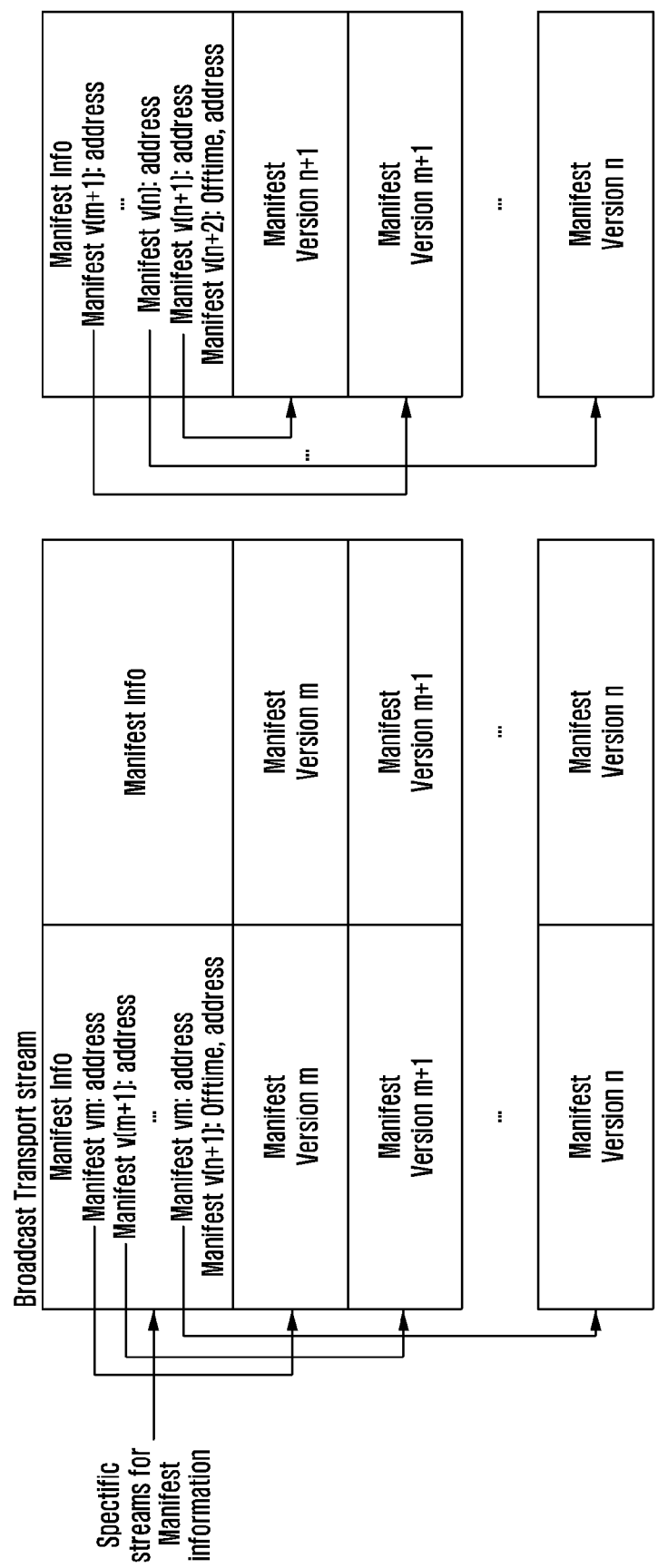
FIG. 6 illustrates mechanism 3, wherein specific streams are assigned for manifest information and signal information about previous, current, and future manifests according to an exemplary embodiment of the present invention.

FIG. 6 illustrates mechanism 3, wherein specific streams are assigned for manifest information and signal information about previous, current, and future manifests according to an exemplary embodiment of the present invention.

3. Mechanism 3

Referring to FIG. 6, some clients may have interest about a current manifest, some may want to know when the next updated manifest is available, and some may still have interest about previous manifests.

Some specific stream is assigned for manifest information. The manifest information signals the information about previous, current, and future manifests. For example, manifests version m till version n−1 are the previous manifests, but they are still accessible. So the access address of each previous manifest is signaled in the manifest information table. Manifest version n is a current manifest and the access address is signaled. Manifest version n+1 is the next updated manifest, and its off-time is signaled for a later access. If the access address of the next manifest is known, it could also be signaled. Both manifest information and manifest are delivered over a broadcast transport stream. However, the manifest could also be delivered in other networks in the application. In this case, the access information could be carried in the 'address'.

4. Client/Server Procedure

Considering the mechanism 2.1 as an example, the client and server procedure is described. A procedure based on other mechanisms is similar with some modifications.

Figure 7:
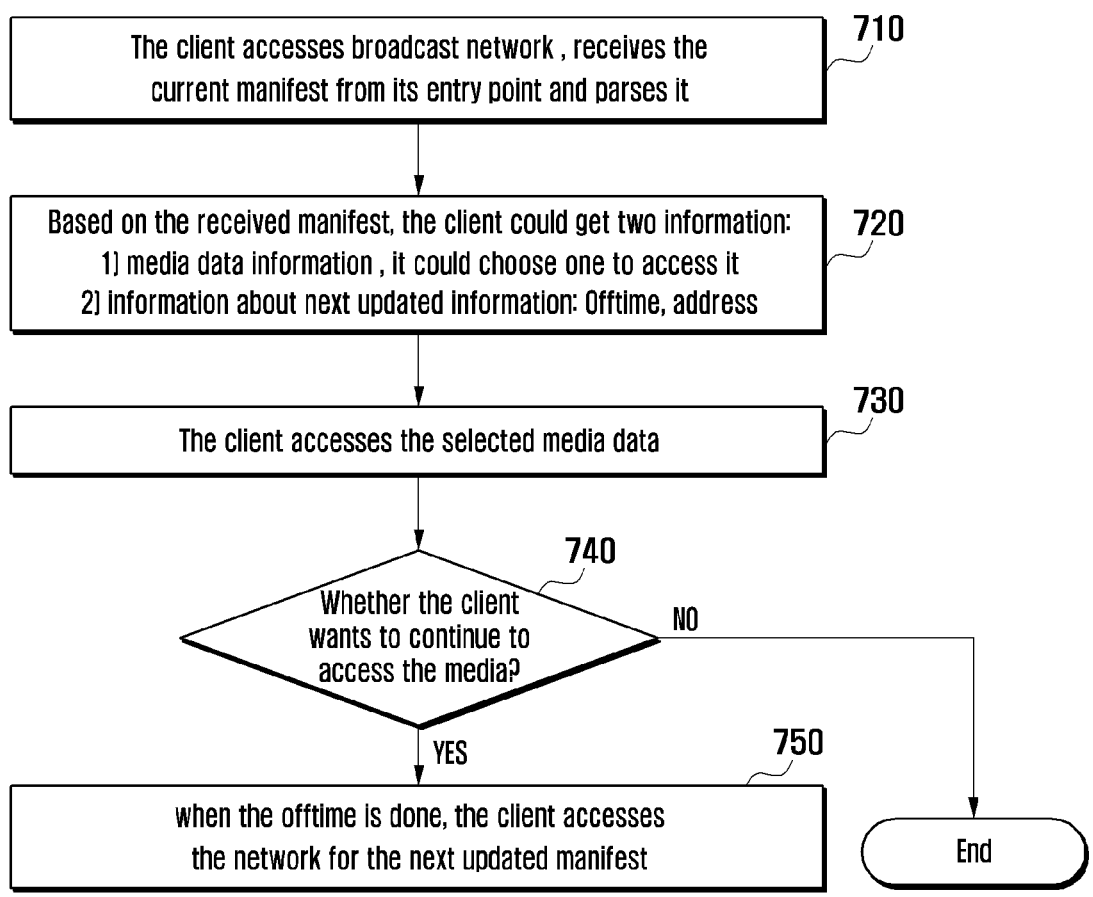
FIG. 7 illustrates a client procedure according to an exemplary embodiment of the present invention.

FIG. 7 illustrates a client procedure according to an exemplary embodiment of the present invention.

Referring to FIG. 7, a client accesses the broadcast network, receives the current manifest from its entry point and parses it at step 710. From that, at step 720, the client could know the media data information and choose one to access. Based on new added attributes about the next manifest, the client could also know the off-time and address of an updated manifest. Accordingly, after accessing the current media data at step 730, the client determines whether to continue to access the media at step 740. If the client wants to continue, the client could access the next updated manifest when off-time is done at step 750. In this way, the client could continue accessing the manifest and media until it wants to stop.

Figure 8:
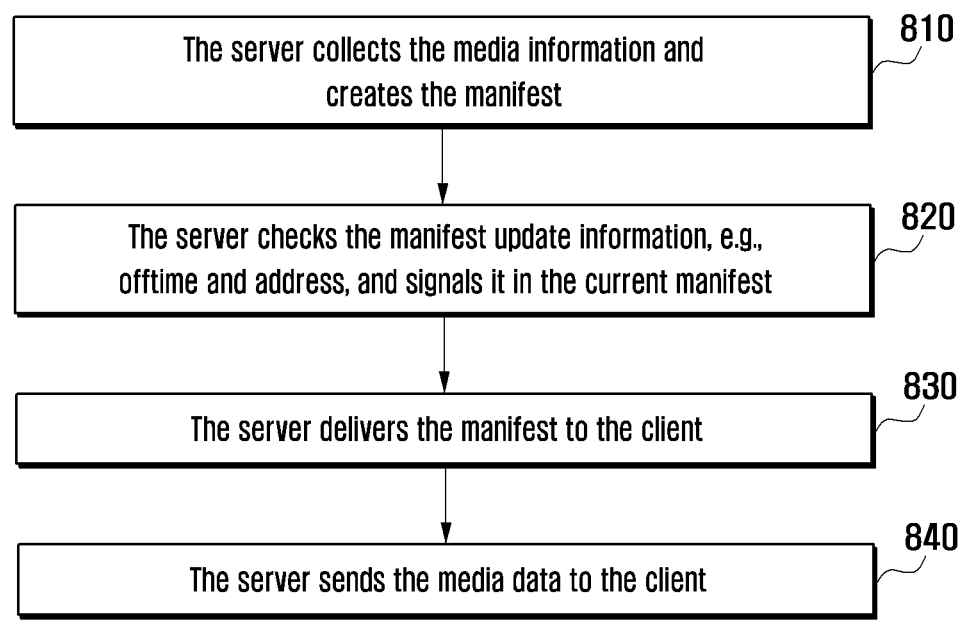
FIG. 8 illustrates a server procedure according to an exemplary embodiment of the present invention.

FIG. 8 illustrates a server procedure according to an exemplary embodiment of the present invention.

Referring to FIG. 8, except for media data information, the server also collects information about the next updated manifest, e.g., off-time and address at step 810 and step 820, and signals it all in the current manifest to the client at step 830. In addition, the server sends the media data to the client at step 840. In this way, the client could choose the media data, and know when and where to access the next updated manifest.

5. Structure of Client/Server

Figure 9:
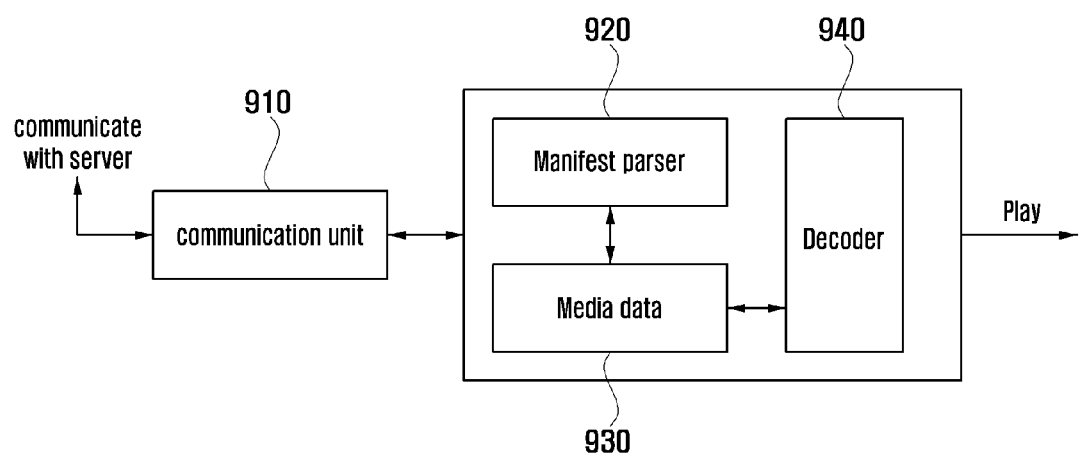
FIG. 9 illustrates a client structure according to an exemplary embodiment of the present invention.

FIG. 9 illustrates a client structure according to an exemplary embodiment of the present invention.

Referring to FIG. 9, in a pure broadcast network, the client will only receive data from a server. In a hybrid network, the client may communicate with the server through communication unit 910. Manifest parser 920 will analyze the manifest to get the media information and manifest update information. Media data 930 will analyze the media data and send it to decoder 940 for decoding and playing.

Figure 10:
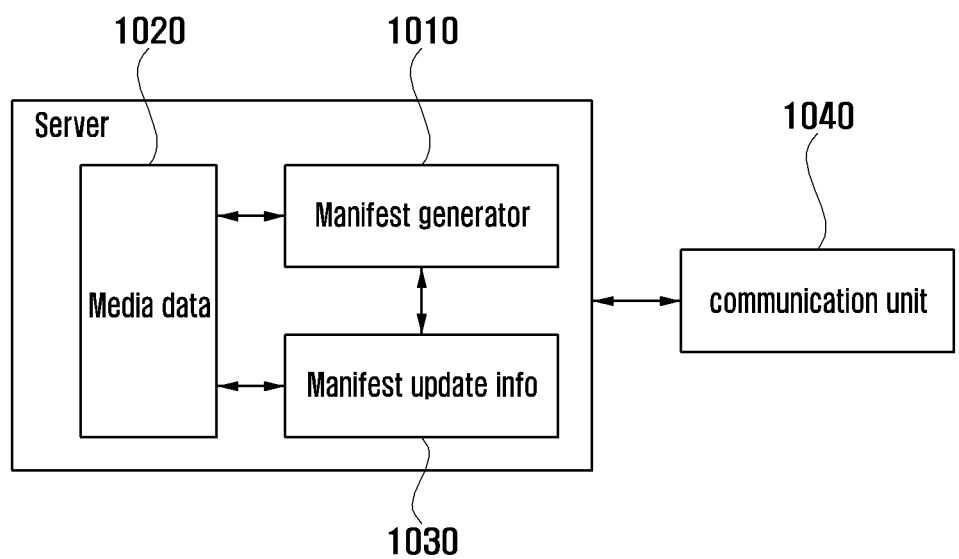
FIG. 10 illustrates a server structure according to an exemplary embodiment of the present invention.

FIG. 10 illustrates a server structure according to an exemplary embodiment of the present invention.

Referring to FIG. 10, manifest generator 1010 will create manifest information based on media data 1020 and manifest update information 1030, and will deliver it to the client through communication unit 1040.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for receiving manifest information by a client from a broadcast involved system, the method comprising:
   accessing the broadcast involved system;
   receiving timing information comprising a specific entry point to check the manifest information; and
   acquiring the manifest information from a broadcasting channel based on the timing information,
   wherein the manifest information comprises an adaptive control information relating to each segment for an adaptive media stream which the client selectively receives, and a field indicating version information of a current manifest information.

2. The method of claim 1, wherein the specific entry point comprises a fixed address or the specific entry point is signaled in a fixed field of an INTerrupt (INT) table.

3. The method of claim 1, wherein the receiving of the timing information further comprises receiving off-time information indicating an off-time between the current manifest information and next updated manifest information.

4. The method of claim 3, wherein the manifest information further comprises the off-time information, and
   wherein the off-time information comprises
   NextManifestAddress information indicating an address of next manifest information, and NextManifestOfftime information indicating the off-time between the current manifest information and the next updated manifest information.

5. The method of claim 3, wherein the off-time information is received from a specific stream.

6. The method of claim 1, wherein the manifest information further comprises at least one of previous manifest information, current manifest information, and future manifest information, and
   wherein the manifest information is received from a specific stream.

7. The method of claim 1, wherein the manifest information comprises information indicating a previous manifest version.

8. The method of claim 1, wherein the receiving of the timing information further comprises receiving information indicating a previous manifest version.

9. The method of claim 8, wherein the information indicating a previous manifest version includes an address of the corresponding previous manifest version.

10. An apparatus for receiving manifest information from a broadcast involved system, the apparatus comprising:
    a communication unit for receiving timing information comprising a specific entry point to check the manifest information when accessing the broadcast involved system; and
    a manifest parser for acquiring the manifest information from a broadcasting channel based on the timing information,
    wherein the manifest information comprises an adaptive control information relating to each segment for an adaptive media stream which the communication unit selectively receives, and a field indicating version information of a current manifest information.

11. The apparatus of claim 10, wherein the specific entry point comprises a fixed address or the specific entry point is signaled in a fixed field of an INTerrupt (INT) table.

12. The apparatus of claim 10, wherein the manifest parser receives off-time information indicating an off-time between current manifest information and next updated manifest information.

13. The apparatus of claim 12, the manifest information further comprises the off-time information, and
    wherein the off-time information comprises
    NextManifestAddress information indicating an address of next manifest information, and NextManifestOfftime information indicating the off-time between the current manifest information and the next updated manifest information.

14. The apparatus of claim 12, wherein the off-time information is received from a specific stream.

15. The apparatus of claim 10, wherein the manifest information further comprises at least one of previous manifest information, current manifest information, and future manifest information, and
    wherein the manifest information is received from a specific stream.

16. The apparatus of claim 10, wherein the manifest information comprises information indicating a previous manifest version.

17. The apparatus of claim 10, wherein the communication unit is configured to receive receiving information indicating a previous manifest version.

18. The apparatus of claim 17, wherein the information indicating a previous manifest version includes an address of the corresponding previous manifest version.

* * * * *